United States Patent
Kikuchi et al.

(10) Patent No.: US 6,943,951 B2
(45) Date of Patent: Sep. 13, 2005

(54) OPTICAL COMPONENT AND DISPERSION COMPENSATION METHOD

(75) Inventors: Kazuro Kikuchi, 1304, Forme Tsunashima Cres Towers, 1139-1, Shin-Yoshidacho, Kouhoku-ku, Yokohama-shi, Kanagawa-ken (JP); Yuichi Takushima, Yokohama (JP); Mark Kenneth Jablonski, Toda (JP); Yuichi Tanaka, Toda (JP); Haruki Kataoka, Toda (JP); Hironori Tokita, Toda (JP); Kenji Furuki, Toda (JP); Noboru Higashi, Toda (JP); Kazunari Sato, Toda (JP); Shiro Yamashita, Toda (JP)

(73) Assignees: Oyokoden Lab Co., Ltd., Tokyo (JP); Kazuro Kikuchi, Kanagawa-ken (JP)

(*) Notice: Subject to any disclaimer, the term of this patent is extended or adjusted under 35 U.S.C. 154(b) by 70 days.

(21) Appl. No.: 10/275,918

(22) PCT Filed: May 10, 2001

(86) PCT No.: PCT/JP01/03888

§ 371 (c)(1),
(2), (4) Date: Apr. 16, 2003

(87) PCT Pub. No.: WO01/86328

PCT Pub. Date: Nov. 15, 2001

(65) Prior Publication Data

US 2003/0161045 A1 Aug. 28, 2003

(30) Foreign Application Priority Data

May 10, 2000 (JP) .................................... 2000-137370

(51) Int. Cl.⁷ .................................................. G02B 1/10
(52) U.S. Cl. ...................... 359/586; 359/584; 359/587; 359/588; 385/24; 385/32; 385/49
(58) Field of Search ................................ 359/586, 584, 359/587, 588, 589; 385/24, 31, 32, 38, 49

(56) References Cited

U.S. PATENT DOCUMENTS

2004/0062945 A1 * 4/2004 Domash et al. ............. 428/641

FOREIGN PATENT DOCUMENTS

| JP | 7-245584 A | 9/1995 |
|---|---|---|
| JP | 8-227014 A | 9/1996 |
| JP | 10-48567 A | 2/1998 |
| JP | 11-109174 A | 4/1999 |
| JP | 2000-105313 A | 4/2000 |

* cited by examiner

Primary Examiner—Fayez G. Assaf
(74) Attorney, Agent, or Firm—Nixon & Vanderhye P.C.

(57) ABSTRACT

An optical component of the present invention is compensated its optical dispersion, including third order dispersion, at low loss using optical dispersion compensating element comprising multi-layer film. In the optical component, an optical dispersion compensating element and a functional element are connected in series along an optical path.

22 Claims, 6 Drawing Sheets

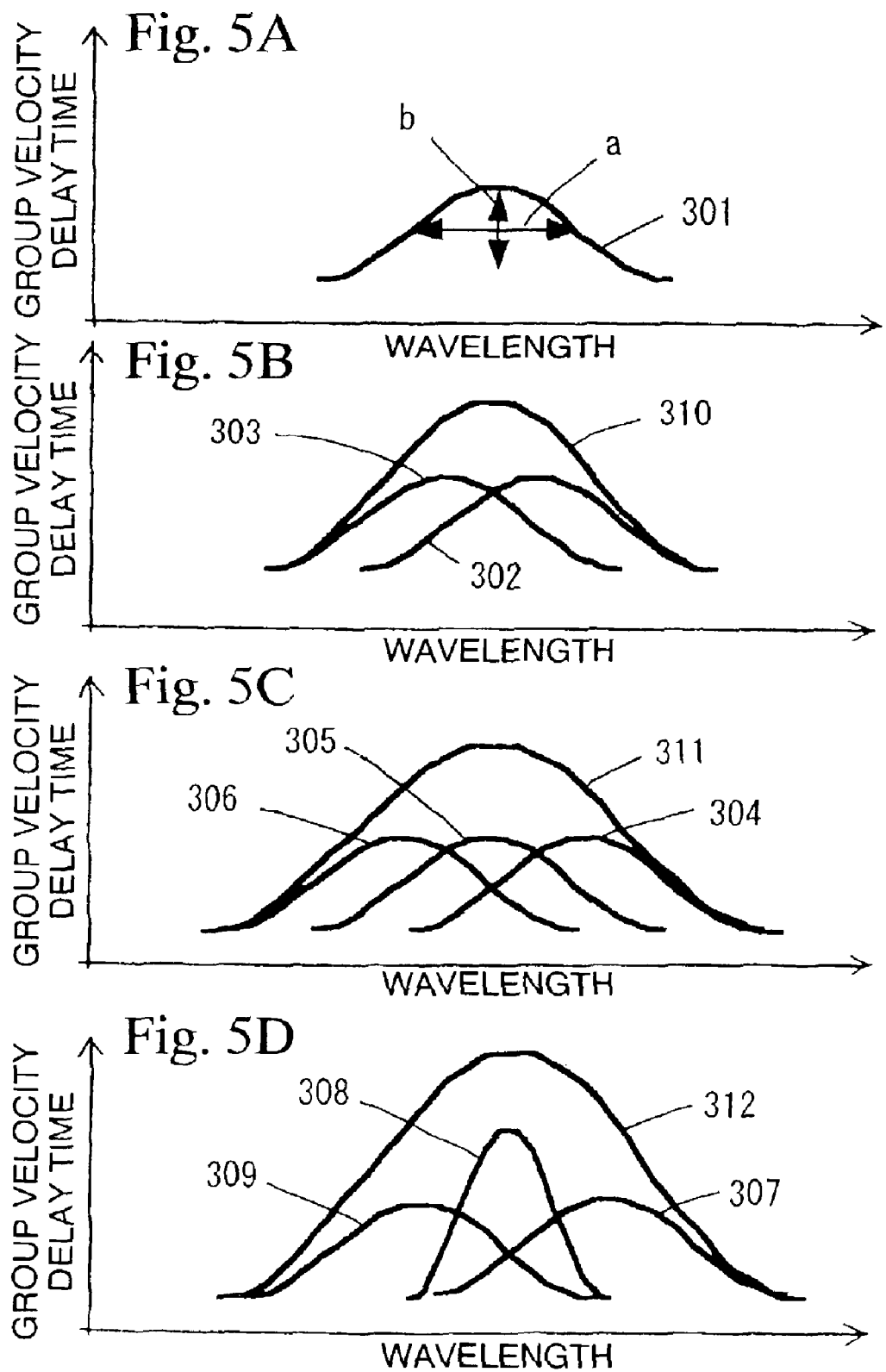

OPTICAL COMPONENT AND DISPERSION COMPENSATION METHOD

TECHNICAL FIELD

The present invention relates to an optical component comprising an element such as wavelength selection filter compensated wavelength dispersion (hereinafter, also to simply be referred to as dispersion) and its dispersion compensation method. In the following explanation of the present invention, dispersion means wavelength dispersion, optical dispersion compensation is simply referred to as dispersion compensation, an optical dispersion compensating element is simply referred to as a dispersion compensating element, and optical dispersion compensation method is simply referred to as dispersion compensation method.

The present invention relates to a dispersion compensating element comprising an element capable of compensating for dispersion of the second order or more (to be described later) occurring in a signal light through optical communications using an optical fiber for the transmission path (hereinafter, the element capable of compensating for dispersion of the second order dispersion is to simply be referred to as an element able to change the second order dispersion or the second order dispersion compensating element also, and while similarly, an element capable of compensating the third order dispersion to be described later is to simply be referred to as an element able to change the third order dispersion or the third order dispersion compensating element also).

More detailed, the present invention relates to especially a dispersion compensating element capable of compensating for dispersion of the third order or more, or a dispersion compensating element capable of compensating for dispersion of the second order and the third order, and dispersion compensation method using the element. There are also cases in which the dispersion compensating element is only the third order dispersion compensating element described above, cases in which they may comprise a means for changing the incident position of incident light in a direction within the incident surface to be described later, cases in which said elements may be composed so as to be capable of not only the third order or more dispersion compensation but also the second order dispersion compensation, cases in which they are mounted in a case, and cases in which they are in the form of a so-called chip or wafer that is not mounted in a case. The dispersion compensating element of the present invention is able to be an element in each case above-mentioned, and take various forms according as purpose of application or sale etc.

In the present invention, the second order dispersion compensation refers to "compensating the slope of a wavelength versus time characteristics curve to be described later using FIG. 7A", while the third order dispersion compensation refers to "compensating the curvature of a wavelength versus time characteristics curve to be described later using FIG. 7A".

BACKGROUND ART

In optical communications using optical fibers for the communication transmission path, together with progress of the technology used in its utilization and expansion of the range of utilization, there is a need for increasing distance of the communication transmission path and increasing speed of the communication bit rate. In such an environment, the dispersion that occurs in a signal light transmitting through optical fibers becomes a serious problem, and various attempts have been made to compensate for that dispersion. At the present time, the second order dispersion has become a serious problem, and various proposals have been made for its compensation, several of which have been effective to a certain extent.

However, as the demands being placed on optical communications become increasingly severe, compensation of the second order dispersion only during transmission has become insufficient, and compensation of the third order dispersion is becoming an important topic.

The following provides an explanation of a conventional method of compensating for the second order dispersion using FIGS. 7A through 7C and FIG. 8.

FIG. 8 is a drawing that explains the dispersion vs. waveform characteristics of a single mode optical fiber (hereinafter, also to be referred to as SMF), dispersion compensating fiber and dispersion shift fiber (hereinafter, also to be referred to as DSF). In FIG. 8, reference symbol 601 indicates a graph of the dispersion vs. wavelength characteristics of an SMF, reference symbol 602 indicates a graph of the dispersion vs. wavelength characteristics of a dispersion compensating fiber, and reference symbol 603 indicates a graph of the dispersion vs. wavelength characteristics of a DSF. In the graphs, dispersion is plotted on the vertical axis and wavelength is plotted on the horizontal axis.

As is clear in FIG. 8, in the SMF, as the wavelength of the light that is input to the fiber becomes longer from 1.3 $\mu$m to 1.8 $\mu$m, dispersion increases, while in the dispersion compensating fiber, as the wavelength of the input light becomes longer from 1.3 $\mu$m to 1.7 $\mu$m, dispersion decreases. In the DSF, as the wavelength of the input light becomes longer from 1.2 $\mu$m to around 1.55 $\mu$m, dispersion decreases, and as the wavelength of the input light increases from around 1.55 $\mu$m to 1.8 $\mu$m, dispersion increases. In the DSF, in optical communications at conventional communication bit rate on the order of 2.5 Gbps (2.5 gigabits per second), dispersion does not present a problem in optical communications for a wavelength of input light around 1.55 $\mu$m.

FIGS. 7A through 7C are drawings that explain a method of compensating primarily second order dispersion. FIG. 7A explains wavelength vs. time characteristics and optical intensity vs. time characteristics, FIG. 7B explains a transmission example in which second order dispersion compensation is performed using a dispersion compensating fiber in a transmission path using SMF, while FIG. 7C explains a transmission example in a transmission path composed of only SMF.

In FIGS. 7A through 7C, reference symbols 501 and 511 are graphs showing the characteristics of signal light prior to being input into the transmission path, reference symbol 530 indicates a transmission path composed of SMF 531, reference symbols 502 and 512 are graphs showing the characteristics of a signal light when the signal light having the characteristics shown in graphs 501 and 511 is transmitted along transmission path 530 and comes out from transmission path 530, reference symbol 520 is a transmission path composed of dispersion compensating fiber 521 and SMF 522, and reference symbols 503 and 513 are graphs showing the characteristics of a signal light when the signal light having the characteristics shown in graphs 501 and 511 is transmitted along transmission path 520 and comes out from transmission path 520. Reference symbols 504 and 514 are graphs showing the characteristics of a signal light when the signal light having the characteristics shown in graphs 501 and 511 is transmitted along transmission path 520, comes out from transmission path 520, and then subjected to the desirable third order dispersion compensation described later according to the present invention, and closely coincide with graphs 501 and 511. In the graphs 501, 502, 503, and 504, each graph has wavelength plotted on the vertical axis and time (or actual time) plotted on the horizontal axis, while in the graphs 511, 512, 513, and 514, each graph has optical intensity plotted on the vertical axis and time (or actual time) plotted on the horizontal axis. Furthermore, reference symbols 524 and 534 indicate transmitters, while reference symbols 525 and 535 indicate receivers.

As was previously described, since in the case of conventional SMF, dispersion increases as a wavelength of a signal light becomes longer from 1.3 µm to 1.8 µm, during high speed communications or long distance transmissions, a delay occurs in the group velocity caused by dispersion. In transmission path 530 composed of an SMF, the signal light is delayed considerably at longer wavelengths more than at shorter wavelengths during transmission, and becomes as shown in graphs 502 and 512. The signal light that is deformed in this way may be unable to be accurately received as a signal light as a result of being unable to be distinguished from the signal light before and after it in, for example, high speed communications or long distance transmissions.

In the past, in order to solve such problems, dispersion was compensated (or corrected) by using, for example, a dispersion compensating fiber as shown in FIG. 7B. Dispersion compensating fiber of the prior art is made so that dispersion decreases as the wavelength becomes longer from 1.3 µm to 1.8 µm as previously described in order to solve the problem of SMF in which dispersion increased as the wavelength becomes longer from 1.3 µm to 1.8 µm. As shown with transmission path 520 of FIG. 7B for example, dispersion compensating fiber can be used by connecting dispersion compensating fiber 521 to SMF 522. In the above-mentioned transmission path 520, since the signal light is considerably delayed at longer wavelengths as compared with shorter wavelengths in SMF 522, and is then considerably delayed at shorter wavelengths as compared with longer wavelengths in dispersion compensating fiber 521, as shown in graphs 503 and 513, the grade of deformation can be held to a lower level than the deformation indicated in graphs 502 and 512.

However, in a compensation method for the second order wavelength dispersion of the prior art described above that uses a dispersion compensating fiber, dispersion compensation of signal light that has been transmitted along a transmission path cannot be performed in the state of the signal light prior to being input into the transmission path, namely until the shape of graph 501, and that compensation is limited to until the shape of graph 503. As shown in graph 503, in the compensation method for the second order wavelength dispersion of the prior art that uses a dispersion compensating fiber, light having a center wavelength of the signal light is not delayed in comparison with light having a shorter wavelength than the center wavelength of the signal light or light having a longer wavelength than the center wavelength of the signal light, while only the light of components having a shorter wavelength or longer wavelength than the light of the center wavelength component of the signal light is delayed. As shown in graph 513, sometimes ripple may occur in a part of the graph.

Furthermore, result of researches by the inventors of the present invention revealed that above-mentioned dispersion occurs in a signal light transmitting through not only optical fiber but also optical component such as wavelength selection filter. In the case of using such optical component for optical communications or optical equipment, the dispersion also occurs in a signal light.

These phenomena are becoming serious problems including the prevention of accurate signal reception accompanying greater needs for longer transmission distances and faster communication speeds of optical communications. For example, in the case of high speed communications in which signals are transmitted at a communications bit rate of 40 Gbps (40 gigabits per second) over a distance of 10,000 km or higher speed communications in which signals are transmitted at 80 Gbps over a distance on the order of several thousands km, these phenomena are a cause of considerable concern and are viewed as extremely serious problems. In such high speed communications, the use of conventional optical fiber communication systems is considered to be difficult. These phenomena are also becoming a serious problem from an economic standpoint of system construction, for example, such as even resulting in a need to change the material of the optical fibers themselves.

Since it is difficult to compensate for previously mentioned dispersion by the second order dispersion compensation only, and the third order or more dispersion compensation becomes necessary.

In the past, although DSF was used as an optical fiber (hereinafter, also to simply be referred to as a fiber) that reduce the second order dispersion for signal light having a wavelength around 1.55 µm, as is clear from the previously mentioned characteristics of FIG. 7A and FIG. 8, this fiber is not able to compensate the third order dispersion that is an object of the present invention.

In the realization of higher communication speeds and longer communication distances of optical communications, there is a growing awareness that the third order dispersion presents a significant problem, and its compensation is becoming an important topic. Although some attempts have been made to solve the problem of compensation of the third order dispersion, a third order dispersion compensating element or compensation method capable of adequately solving the problems of the prior art is not realized yet.

Although an example of using a fiber formed a diffraction grating pattern has been reported as a method for compensating the third order dispersion, this method has fatal shortcomings such as being not able to achieve the necessary compensation, having large loss, and having a large geometry. Moreover, the fiber is expensive and cannot be expected to be used practically.

As an example of optical dispersion compensating element for the above-mentioned third order dispersion compensation, the inventors of the present invention, independently from the present invention, succeeded in compensation of the third order dispersion to a certain extent by using an optical dispersion compensating element having a multi-layer film of a dielectric substance and so forth, and it brought a great advance of the optical communication technology of the prior art. However, as a request from the realization of higher communication speeds and longer communication distances of optical communications, in order to ideally perform the third order dispersion compensation in the case of high speed communications at a communication bit rate of 40 Gbps or 80 Gbps and so forth, or to adequately perform the third order dispersion compensation in multi-channel optical communications, realization of a dispersion compensating element or dispersion compensation method is desired that is able to adequately compensate the second order and the third order dispersion over an even broader wavelength band.

Since, at the present time, the dispersion that occurs in a signal light transmitting through a transmission path using optical fibers becomes a serious problem, the problem of optical component such as wavelength selection filter is not becoming an important topic. However, as described above, according to the results of research by the inventors of the present invention, the dispersion of the optical component is an important topic for higher communication speeds and longer communication distances of optical communications, and improvement of function and abilities of the optical component. At the present time, the optical component such as wavelength selection filter which is compensated the dispersion from such point of view is not sold.

In consideration of these points, the purpose of the present invention is to provide optical components, which is used for an optical communication systems in which an optical fiber is used for an optical communication path or optical equipments, sufficiently compensated the dispersion that occurs in a signal light and to provide its dispersion compensation method.

DISCLOSURE OF THE INVENTION

In addition to relating to an optical component which comprises an optical dispersion compensating element comprising multi-layer film and an optical element such as wavelength selection filter, more concretely, relating to an optical component having a function capable of compensating dispersion of signal light caused through an optical element such as wavelength selection filter, the present invention also relates to a dispersion compensation method in which the dispersion compensation is performed using an optical component, which is substantially equivalent to the above optical component of the present invention, constituted by combining a dispersion compensating element and an optical element. Therefore, to explain more precisely the present invention, in the following explanation, the contents of the dispersion compensating element of the present invention are explained in the form of a dispersion compensating element used in the optical component of the present invention, and also serves as an explanation of the dispersion compensation method of the present invention.

To achieve the object of the present invention, the major characteristic of the optical component of the present invention is that the optical component of the present invention is an optical component comprising at least one optical element such as wavelength selection filter; wherein the optical element and an optical dispersion compensating element comprising multi-layer film which is capable of performing dispersion compensation in a form of wavelength dispersion are placed in an optical path of signal light.

An example of the optical component of the present invention is characterized in that the optical dispersion compensating element is an element capable of performing dispersion compensation comprising multi-layer film which shows a group velocity delay time vs. wavelength characteristics curve having at least one extreme value in a wavelength range being used in optical communications.

An example of the optical component of the present invention is characterized in that the multi-layer film comprises: at least five kinds of laminated films with different optical properties, namely, at least five layers of laminated films with different optical properties such as optical reflectance and film thickness; at least three kinds of reflective layers with mutually different optical reflectance and at least two light transmitting layers in addition to the three kinds of reflective layers, each of the three types of reflective layers and each of the two light transmitting layers being alternately disposed; and a first layer in the form of a first reflective layer, a second layer in the form of a first light transmitting layer, a third layer in the form of a second reflective layer, a fourth layer in the form of a second light transmitting layer, and a fifth layer in the form of a third reflective layer, in that order from one side in the direction of film thickness of the multi-layer film, that, when the center wavelength of the incident light is defined as $\lambda$, and the film thickness is defined as an optical path length relative to light of the center wavelength $\lambda$ of the incident light, the film thickness of each layer composing the multi-layer film in the first through fifth layers is the film thickness of a value within the range of about an integer multiple of $\lambda/4$ in a sense of $\lambda/4\pm3\%$, that the multi-layer film is composed with a plurality of sets of layers combining a layer H, which is a layer having a higher refractive index and a film thickness of about $\lambda/4$, and a layer L, which is a layer having a lower refractive index and a film thickness of about $\lambda/4$, and that the reflectance relative to the center wavelength 1 of incident light of each reflective layer of the multi-layer film gradually becomes larger from one side of the multi-layer film in the direction of film thickness of the multi-layer film.

An example of the optical component of the present invention is characterized in that the film thickness of at least one of the laminated film constituting the multi-layer film varies in a direction within a plane in a cross section parallel to the incident surface of light of the multi-layer film, namely, within the incident surface.

An example of the optical component of the present invention is characterized in that an adjustment means which adjusts the film thickness of at least one laminated film of the multi-layer film, or an adjustment means which varies the incident position of light in the incident surface of the multi-layer film, is provided by coupling to the multi-layer film.

An example of the optical component of the present invention is characterized in that the layer H is formed with a layer selected from the group consisting of Si, Ge, $TiO_2$, $Ta_2O_5$, and $Nb_2O_5$.

An example of the optical component of the present invention is characterized in that the layer L is formed with a layer comprised of material of which optical reflectance is lower than material forming the layer H.

An example of the optical component of the present invention is characterized in that layer L is formed with a layer comprised of $SiO_2$.

An example of the optical component of the present invention is characterized in that the optical element and the optical dispersion compensating element are packaged in the same case.

An example of the optical component of the present invention is characterized in that input and output to the optical component are made using optical fiber.

An example of the optical component of the present invention is characterized in that the optical element and the optical dispersion compensating element are packaged in different cases, and the optical element and the optical dispersion compensating element are optically connected through optical fiber.

To achieve the object of the present invention, the major characteristic of an optical dispersion compensation method is that in an example of the optical component of the present invention, the optical dispersion compensation is performed using, placed in an optical path of signal light, an optical element and an optical dispersion compensating element comprising multi-layer film which is capable of performing dispersion compensation in a form of wavelength dispersion.

An example of the optical dispersion compensation method of the present invention is characterized in that the optical dispersion compensating element used in the method is a multi-layer film which shows a group velocity delay time vs. wavelength characteristics curve having at least one extreme value in a wavelength range being used in optical communications or in optical equipment.

An example of the optical dispersion compensation method of the present invention is characterized in that the multi-layer film comprises at least three reflective layers with mutually different optical reflectance and at least two light transmitting layers formed between the reflective layers.

An example of the optical dispersion compensation method of the present invention is characterized in that the multi-layer film comprises: at least five kinds of laminated films with different optical properties, namely, at least five layers of laminated films with different optical properties such as optical reflectance and film thickness; at least three kinds of reflective layers with mutually different optical reflectance and at least two light transmitting layers in addition to the three kinds of reflective layers, each of the three types of reflective layers and each of the two light transmitting layers being alternately disposed; and a first layer in the form of a first reflective layer, a second layer in the form of a first light transmitting layer, a third layer in the form of a second reflective layer, a fourth layer in the form of a second light transmitting layer, and a fifth layer in the form of a third reflective layer, in that order from one side in the direction of film thickness of the multi-layer film, that, when the center wavelength of the incident light is defined as $\lambda$, and the film thickness is defined as an optical path length relative to light of the center wavelength $\lambda$ of the incident light, the film thickness of each layer composing the multi-layer film in the first through fifth layers is the film thickness of a value within the range of about an integer multiple of $\lambda/4$ in a sense of $\lambda/4\pm3\%$, that the multi-layer film is composed with a plurality of sets of layers combining a layer H, which is a layer having a higher refractive index and a film thickness of about $\lambda/4$, and a layer L, which is a layer having a lower refractive index and a film thickness of about $\lambda/4$, and that the reflectance relative to the center wavelength 1 of incident light of each reflective layer of the multi-layer film gradually becomes larger from one side of the multi-layer film in the direction of film thickness of the multi-layer film.

To achieve the object of the present invention, the major characteristic of the optical dispersion compensating element used in the dispersion compensation of the present invention is that a dispersion compensating element is composed of at least two elements capable of performing dispersion compensation or at least two portions of an element capable of performing dispersion compensation (the above elements capable of performing dispersion compensation and portions of elements capable of performing dispersion compensation is hereinafter generally referred to as elements capable of performing dispersion compensation), by connecting in series along the optical path of a signal light, and comprises a dispersion compensating element using a multi-layer film (to be simply referred to as a multi-layer film element).

To achieve the object of the present invention, the major characteristic of the optical dispersion compensating element used in the dispersion compensation of the present invention is that the element capable of performing dispersion compensation is an optical dispersion compensating element which is an element capable of performing dispersion compensation using group velocity delay time vs. wavelength characteristics of a multi-layer film, and shows group velocity delay time vs. wavelength characteristics curve having at least one extreme value in the dispersion compensation target wavelength range or in the vicinity of the dispersion compensation target wavelength range. The shape of the group velocity delay time vs. wavelength characteristics curve of the optical dispersion compensating element used in the dispersion compensation method of the present invention and the shape of the group velocity delay time vs. wavelength characteristics curve of each element capable of performing dispersion compensation composing the optical dispersion compensating element used in the dispersion compensation method of the present invention are generally different.

An example of the optical dispersion compensating element of the present invention is characterized in that the dispersion compensating element comprises: at least five kinds of laminated films with different optical properties, namely, at least five layers of laminated films with different optical properties such as optical reflectance and film thickness; at least three kinds of reflective layers including at least two reflective layers having mutually different optical reflectance and at least two light transmitting layers in addition to the three kinds of reflective layers, each of the three types of reflective layers and each of the two light transmitting layers being alternately disposed; and a first layer in the form of a first reflective layer, a second layer in the form of a first light transmitting layer, a third layer in the form of a second reflective layer, a fourth layer in the form of a second light transmitting layer, and a fifth layer in the form of a third reflective layer, in that order from one side in the direction of film thickness of the multi-layer film, that, when the center wavelength of the incident light is defined as $\lambda$, and the film thickness is defined as an optical path length relative to light of the center wavelength $\lambda$ of the incident light, the film thickness of each layer composing the multi-layer film in the first through fifth layers is the film thickness of a value within the range of about an integer multiple of $\lambda/4$ in a sense of $\lambda/4\pm3\%$, more desirably in a sense of $\lambda/4\pm1\%$, that the multi-layer film is composed with a plurality of sets of layers combining a layer H, which is a layer having a higher refractive index and a film thickness of about $\lambda/4$, and a layer L, which is a layer having a lower refractive index and a film thickness of about $\lambda/4$, and that, when the reflectance of the first layer in the form of the first reflective layer is defined as R1, the reflectance of the third layer in the form of the second reflective layer is defined as R3, and the reflectance of the fifth layer in the form of the third reflective layer is defined as R5, they make R1<R3<R5.

An example of the optical dispersion compensating element of the present invention is characterized in that there are a plurality of connection methods or connection paths of a plurality of elements capable of performing dispersion compensation.

An example of the optical dispersion compensating element of the present invention is characterized in that the connection method or connection path of the plurality of elements capable of performing dispersion compensation can be is selected from an outside of the optical dispersion compensating element.

An example of the optical dispersion compensating element of the present invention is characterized in that one of the means to select the connection methods or paths of the elements capable of performing dispersion compensation from the outside of the optical dispersion compensating element is an electrical means.

An example of the optical dispersion compensation method of the present invention is characterized in that there are a plurality of connection methods or connection paths of a plurality of elements capable of per-forming dispersion compensation.

For an example of the optical dispersion compensating element used in the optical dispersion compensation method of the present invention, at least one multi-layer film element comprising at least one of following multi-layer films A through H can be used as an above-mentioned multi-layer film, wherein at least one multi-layer film element comprises: a multi-layer film constituted of at least five kinds of laminated film of different optical properties, (namely, at least five layers of laminated films with different optical properties such as optical reflectance and film thickness); the multi-layer film constituted of at least three kinds of reflective layers, including at least two kinds of reflective layers with mutually different optical reflectance, and at least two light transmitting layers in addition to the three types of reflective layers, each of the three types of reflective layers and each of the two light transmitting layers being alternately disposed; and the multi-layer film constituted of a first layer in the form of a first reflective layer, a second layer in the form of a first light transmitting layer, a third layer in the form of a second reflective layer, a fourth layer in the form of a second light transmitting layer, and a fifth layer in the form of a third reflective layer, in that order, from one side in the direction of film thickness of the multi-layer film, wherein, when multi-layer film A is taken to be a multi-layer film in which five layers of laminated films, namely, first through fifth layers, are respectively formed in order from one side in the direction of thickness of the multi-layer film with a first layer composed by laminating three sets of HL layers in which one layer H and one layer L each are combined in order to make an HL layer, a second layer composed by laminating 10 sets of HH layers in which a layer H and a layer H are combined to make an HH layer, a third layer composed by laminating one layer L and seven sets of HL layers, a fourth layer composed by laminating 38 sets of HH layers, and a fifth layer composed by laminating one layer L and 13 sets of HL layers, when multi-layer film B is taken to be a multi-layer film in which, in lieu of the second layer formed by laminating 10 sets of HH layers of multi-layer film A, the second layer is formed with a laminated film composed by laminating, in order, from one side in the direction of thickness of the film, which is the same direction as the case of multi-layer film A, three sets of HH layers, three sets of LL layers in which a layer L and a layer L are combined to make an LL layer, three sets of HH layers, two sets of LL layers and one set of HH layer, in that order, when multi-layer film C is taken to be a multi-layer film in which, in lieu of the fourth layer formed by laminating 38 sets of HH layers of multi-layer film A or multi-layer film B, the fourth layer is formed with a laminated film composed by laminating, in order, from one side in the direction of thickness of the film, which is the same direction as the case of multi-layer film A, three sets of HH layers, three sets of LL layers, three sets of HH layers, three sets of LL layers, three sets of HH layers, three sets of LL layers, three sets of HH layers, three sets of LL layers, three sets of HH layers, three sets of LL layers, three sets of HH layers, three sets of LL layers, three sets of HH layers and three sets of LL layers and two sets of HH layers, in that order, when multi-layer film D is taken to be a multi-layer film in which five layers of laminated films, namely, first through fifth layers, are respectively formed in order from one side in the direction of thickness of the multi-layer film with a first layer composed by laminating five sets of LH layers in which one layer L and one layer H each are combined, in that order, to make an LH layer, a second layer composed by laminating seven sets of LL layers, a third layer composed by laminating one layer H and seven sets of LH layers, a fourth layer composed by laminating 57 sets of LL layers, and a fifth layer composed by laminating one layer H and 13 sets of LH layers, when multi-layer film E is taken to be a multi-layer film in which five layers of laminated films, namely first through fifth layers, are respectively formed in order from one side in the direction of thickness of the multi-layer film with a first layer composed by laminating two sets of HL layers, a second layer composed by laminating 14 sets of HH layers, a third layer composed by laminating one layer L and 6 sets of HL layers, a fourth layer composed by laminating 24 sets of HH layers, and a fifth layer composed by laminating one layer L and 13 sets of HL layers, when multi-layer film F is taken to be a multi-layer film in which, in lieu of the second layer formed by laminating 14 sets of HH layers of multi-layer film E, the second layer is formed with a laminated film composed by laminating, in order, from one side in the direction of thickness of the film, which is the same direction as the case of multi-layer film E, three sets of HH layers, three sets of LL layers, three sets of HH layers, three sets of LL layers, two sets of HH layers, one set of LL layer and one set of HH layer in that order, when multi-layer film G is taken to be a multi-layer film in which, in lieu of the fourth layer formed by laminating 24 sets of HH layers of multi-layer film E or multi-layer film F, the fourth layer is formed with a laminated film composed by laminating, in order, from one side in the direction of thickness of the film, which is the same direction as the case of multi-layer film E, three sets of HH layers, three sets of LL layers, three sets of HH layers, three sets of LL layers, three sets of HH layers, three sets of LL layers, three sets of HH layers, three sets of LL layers, two sets of HH layers, one set of LL layer, and one set of HH layer, in that order, and when multi-layer film H is taken to be a multi-layer film in which five layers of laminated films, namely, first through fifth layers, are respectively formed, in order, from one side in the direction of thickness of the multi-layer film with a first layer composed by laminating one layer L and four sets of LH layers, a second layer composed by laminating 9 sets of LL layers, a third layer composed by laminating one layer H and six sets of LH layers, a fourth layer composed by laminating 35 sets of LL layers, and a fifth layer composed by laminating one layer H and 13 sets of LH layers.

The following provides an explanation of an optical component of the present invention, mainly with reference to the optical dispersion compensating element used for the dispersion compensation.

BRIEF DESCRIPTION OF THE DRAWINGS

FIG. 5A is a graph representing group velocity delay time vs. wavelength characteristics of a single element capable of performing dispersion compensation that is the base of the present invention.

FIG. 5B is a graph that explains a method for improving group velocity delay time vs. wavelength characteristics using a plurality of elements capable of performing dispersion compensation of the present invention, and represents group velocity delay time vs. wavelength characteristics of an optical dispersion compensating element of the present invention in which two elements capable of performing dispersion compensation are connected in series.

FIG. 5C is a graph that explains a method for improving group velocity delay time vs. wavelength characteristics using a plurality of elements capable of performing dispersion compensation of the present invention, and represents group velocity delay time vs. wavelength characteristics of an optical dispersion compensating element of the present invention in which three elements capable of performing dispersion compensation are connected in series.

FIG. 5D is a graph that explains a method for improving group velocity delay time vs. wavelength characteristics using a plurality of elements capable of performing dispersion compensation of the present invention, and represents group velocity delay time vs. wavelength characteristics of an optical dispersion compensating element of the present invention in which three elements capable of performing dispersion compensation are connected in series.

BEST MODE FOR CARRYING OUT THE INVENTION

The following provides an explanation of a mode for carrying out the present invention with reference to the drawings. Furthermore, although each of the drawings used in the explanation schematically shows the dimensions, shape and layout relationship of each constituent component to a degree that enables the present invention to be understood. For the sake of convenience in providing the explanation, those components may be illustrated while partially changing the enlargement factor, and there are cases in which they may not always resemble the actual objects or descriptions of the embodiments and so forth. In addition, in each of the drawings, similar constituent components are indicated by assigning the same reference symbols, and duplicate explanations may be omitted.

Figure 1:
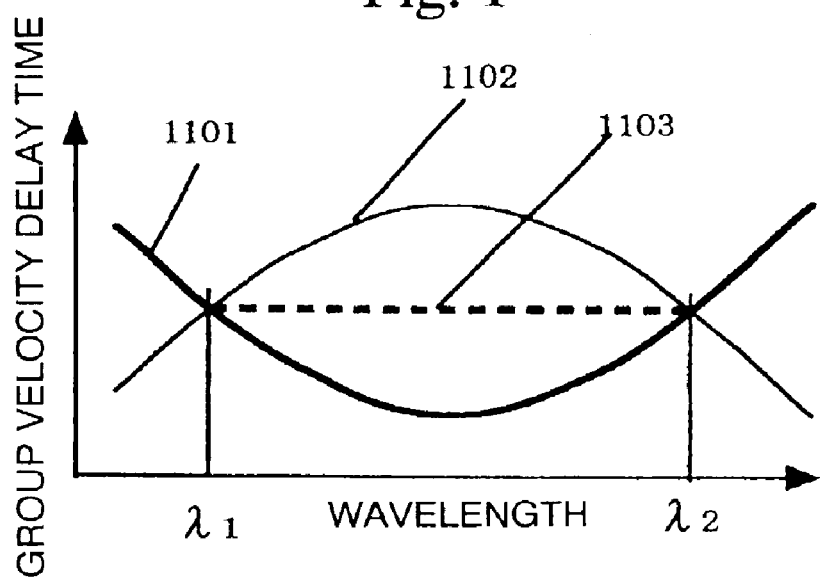
FIG. 1 is a drawing explaining an optical dispersion compensation according to the present invention.

FIG. 1 is a drawing that explains a method for compensating dispersion occurring in communications using an optical fiber for the transmission path with an optical dispersion compensating element. Reference symbol 1101 indicates a group velocity delay time vs. wavelength characteristics curve indicating the third order dispersion of a signal light that remains following compensation of the second order dispersion, reference symbol 1102 indicates a group velocity delay time vs. wavelength characteristics curve of a dispersion compensating element, and reference symbol 1103 indicates a group velocity delay time vs. wavelength characteristics curve between compensation target wavelength band $\lambda_1$–$\lambda_2$ after dispersion of signal light having the dispersion characteristics of curve 1101 has been compensated with a dispersion compensating element having the dispersion characteristics of curve 1102, with group velocity delay time plotted on the vertical axis and wavelength plotted on the horizontal axis.

Figure 2:
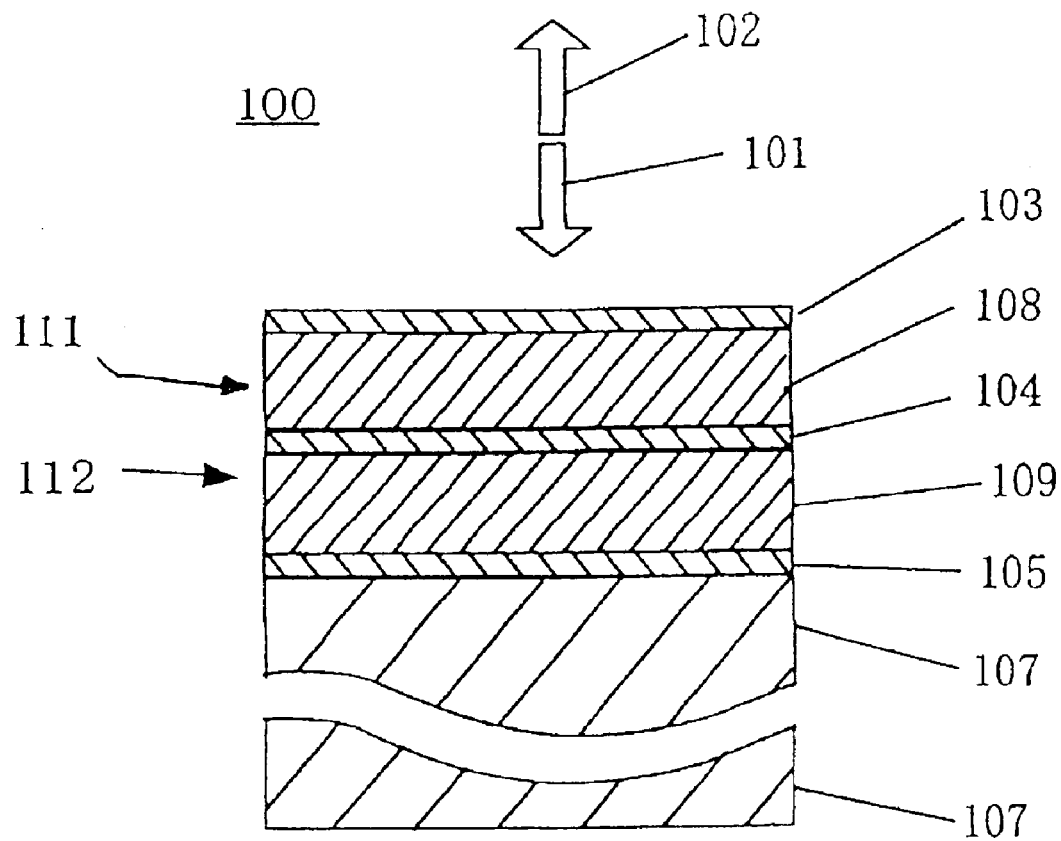
FIG. 2 is a cross-sectional view of a multi-layer film according to the present invention.
Figure 3:
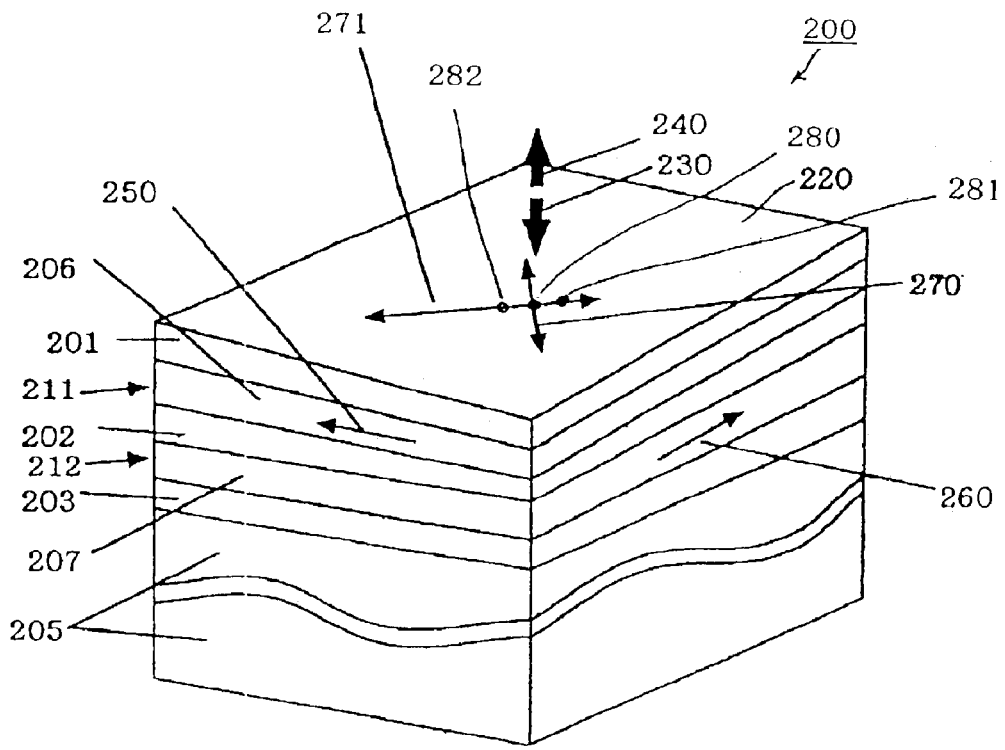
FIG. 3 is a perspective view of a multi-layer film according to the present invention.
Figure 4:
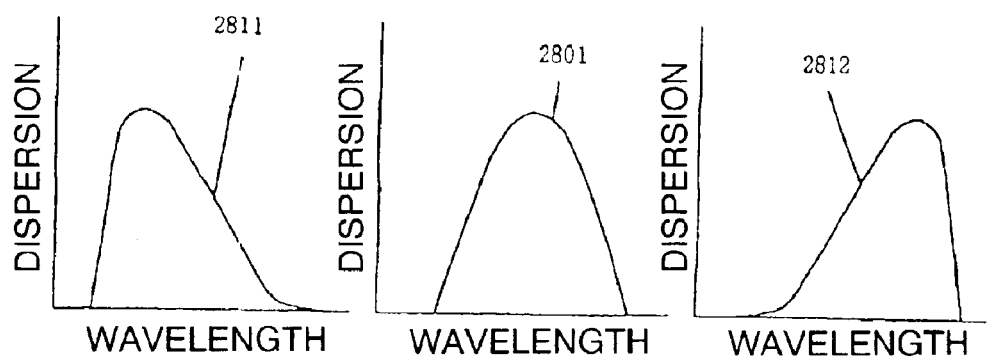
FIG. 4 shows group velocity delay time vs. wavelength characteristics curves of a multi-layer film according to the present invention.

FIGS. 2 through 4 are drawings that explain an example of an optical dispersion compensating element according to the present invention. FIG. 2 is a cross-sectional view of a multi-layer film to be described later, FIG. 3 is a perspective view of a multi-layer film in which a film thickness has been changed, and FIG. 4 is an example of a group velocity time delay vs. wavelength characteristics curve of a multi-layer film.

FIG. 2 is a drawing that provides a schematic explanation of the cross-section of a multi-layer film used as an example of an optical dispersion compensating element for the third order dispersion used in the present invention. In FIG. 2, reference symbol 100 indicates a multi-layer film as an example of an optical dispersion compensating element used in the present invention, reference symbol 101 indicates an arrow showing the direction of incident light, reference symbol 102 indicates an arrow showing the direction of outgoing light, reference symbols 103 and 104 indicate reflective layers (hereinafter to also be referred to as reflective films or light reflecting layers) having reflectance of less than 100%, reference symbol 105 indicates a reflective layer having reflectance of 98–100%, reference symbols 108 and 109 indicate light transmitting layers, reference symbols 111 and 112 indicate cavities. In addition, reference symbol 107 indicates a substrate in which, for example, BK-7 glass (trade name; manufactured by Schott AG, Germany) is used.

Reflectance R(103), R(104), and R(105) of each reflective layer 103, 104 and 105 of FIG. 2 has the relationship of R(103)≦R(104)≦R(105). It is preferable in terms of mass production that the reflectance of each reflective layer are set so that it is mutually different at least between a reflective layers located at one side of a light transmitting layer a reflective layers located at the other side of the light transmitting layer. Namely, each reflective layer is formed so that the reflectance of each reflective layer relative to the center wavelength $\lambda$ of the incident light gradually becomes larger from the side on which incident light enters towards the direction of thickness of the multi-layer film. By composing so that reflectance relative to light of the above wavelength λ of each reflective layer is within the range of 60%≦R(103)≦77%, 96%≦R(104)≦99.8%, and 98%≦R(105), and satisfies the above magnitude relationship of R(103), R(104) and R(105), a group velocity delay time vs. wavelength characteristic curve can be obtained as shown in FIGS. 5A through 5D will be described later. By more preferably making R(103)<R(104)<R(105), and even more preferably, making R(105) close to 100% or 100%, the performance of the optical dispersion compensating element used in the present invention can be further enhanced.

In order to more greatly facilitate production of optical dispersion compensating element used in the present invention, it is preferable that forming conditions of each reflective layer are preferably selected so that the interval when considered as the optical path length between each adjacent reflective layer is respectively different, then design conditions of the reflectance of each reflective layer can be relaxed, and a multi-layer film used in an optical dispersion compensating element for the third order dispersion used in the present invention can be formed with a combination of unit films having a film thickness of one-fourth wavelength λ (namely, films having a film thickness that is an integral multiple of λ/4), and an optical dispersion compensating element for the third order dispersion having high reliability and excellent mass productivity can be inexpensively provided.

Furthermore, although the film thickness of the unit film of the above-mentioned multi-layer film has been described as being one-fourth wavelength λ, as previously described, this refers to λ/4 within the range of error allowed by film formation in mass production, and in consideration of the current level of multi-layer film forming technology, typically refers to a film thickness of λ/4 as referred to in the present invention in terms of λ/4±3%, more preferably λ/4±1%, and the present invention demonstrates also excellent significant effects in this thickness range of the film. So, the thickness of unit film having thickness in this range is called also thickness of λ/4 in the present invention. In particular, by making the above thickness of the unit films λ/4±0.5% (λ/4 in this case indicates λ/4 in the absence of error), a multi-layer film can be formed that does not impair mass productivity, and has low variation and high reliability, and optical dispersion compensating element to be described later using FIGS. 5A through 5D can be provided inexpensively.

In addition, in the present invention, the formation of a multi-layer film has been explained as laminating unit films having a film thickness of λ/4, and although a multi-layer film can be formed by repeating a process of forming one unit film and then forming the next unit film, formation of a multi-layer film is not limited to this process, but rather films having a film thickness of an integral multiple of λ/4 are typically formed continuously, and this type of multi-layer film is naturally also included in the multi-layer film of the present invention. In actuality, several examples of the multi-layer film of the present invention have been able to be formed using a film formation process in which the above reflective layer and light transmitting layer are formed continuously.

FIG. 3 is a drawing that explains an example of changing the film thickness of multi-layer film in the direction within a plane parallel to incident surface 220 to be described later of the above-mentioned multi-layer film 100 in FIG. 2.

In FIG. 3, reference symbol 200 indicates a multi-layer film as an example of the optical dispersion compensating element of the present invention, reference symbol 201 indicates the first reflective layer, reference symbol 202 indicates the second reflective layer, reference symbol 203 indicates the third reflective layer, reference symbol 205 indicates a substrate, reference symbol 206 indicates the first light transmitting layer, reference symbol 207 indicates the second light transmitting layer, reference symbol 211 indicates the first cavity, reference symbol 212 indicates the second cavity, reference symbol 220 indicates a light incident surface, reference symbol 230 indicates an arrow showing the direction of incident light, reference symbol 240 indicates an arrow showing the direction of outgoing light, reference symbol 250 indicates an arrow showing the direction of the first change in film thickness, reference symbol 260 indicates an arrow showing the second change in film thickness, and reference symbols 270 and 271 indicate arrows showing the directions of movement of the incident position of the incident light.

In FIG. 3, the third reflective layer 203, the second light transmitting layer 207, the second reflective layer 202, the first light transmitting layer 206 and the first reflective layer 201 are sequentially formed on substrate 205 using, for example, BK-7 glass.

Multi-layer film is formed so that the thickness of the first light transmitting layer 206 changes in the direction shown with arrow 250 of FIG. 3 (gradually becoming thicker from right to left in the figure), and so that the thickness of the second light transmitting layer 207 changes in the direction shown with arrow 260 (gradually becoming thicker from the front to the back in the figure). The thicknesses of the first through the third reflective layers are formed so as to be composed such that the reflectance of each of the first, the second and the third reflective layers satisfies the conditions complying with the above-mentioned relationship of the above R(103), R(104) and R(105), when the wavelength when the first and second cavity resonance wavelengths coincide has coincided with the center wavelength λ of the incident light.

FIG. 4 provides an explanation of a condition in which group velocity delay time vs. wavelength characteristics curve changes when the incident position of incident light has moved in the direction of arrow 270 or arrow 271 of FIG. 3 as described later so as to allow incident light to enter from the direction of arrow 230 of FIG. 3 and obtain outgoing light in the direction of arrow 240 in incident surface 220 of multi-layer film (hereinafter, to also be referred to as an optical dispersion compensating element) 200 as an example of the optical dispersion compensating element of the present invention.

For above-mentioned wavelength control (wavelength selection) and curve control (curve selection), a means for changing the incident position of the incident light is realized by moving at least one of either optical dispersion compensating element 200 or the incident light relative to the position of the incident light. Various means for moving the above optical dispersion compensating element or incident light can be selected according to the particular circumstances, such as the conditions under which the optical dispersion compensating element is used, its cost and its characteristics. For example, a method in which movement is carried out by a manual means such as screws can be used in consideration of costs or the apparatus, or in order to make accurate adjustments or in order to allow adjustments to be made when unable to make adjustments manually, the use of an electromagnetic step motor or continuous drive motor is effective. In addition, the use of a piezoelectric motor using PZT (lead zirconate titanate) is also effective. In addition, by using a prism or dual core collimator that allows abve-mentioned methods to be combined, or by selecting the incident position by an optical means such as the use of an optical waveguide, the incident position can be selected easily and accurately.

FIG. 4 indicates group velocity delay time vs. wavelength characteristics curves when incident light of center wavelength λ has entered at incident positions 280 through 282, with group velocity delay time plotted on the vertical axis and wavelength plotted on the horizontal axis.

By suitably selecting the conditions by which film thickness changes in the directions of arrows 250 and 260 of reflective layers 201–203 and light transmitting layers 206 and 207, band center wavelength $\lambda_0$ of group velocity delay time vs. wavelength characteristics curve (for example, the wavelength that imparts an extreme value in group velocity delay time vs. wavelength characteristics curve 2801 having a roughly laterally symmetrical shape of FIG. 4) changes while maintaining the shape of group velocity delay time vs. wavelength characteristics curve in nearly the same shape, and when the above-mentioned incident position is moved from that position in the direction indicated with arrow 271, the above-mentioned wavelength $\lambda_0$ hardly changes at all, while the shape of group velocity delay time vs. wavelength characteristics curve can be changed in the manner of curves 2811 and 2812 of FIG. 4. Each curve of FIG. 4 is the curve when the film has been formed on condition which the film thickness increase monotonously in the direction of arrows 250 and 260.

Although each band center wavelength $\lambda_0$ in curves 2801–2812 is set to, for example, the location of a suitable wavelength in the graphs of FIG. 4 according to the objective of dispersion compensation, it may also be, for example, nearly the central value of the wavelength range of the curves shown in FIG. 4, and may be suitably determined according to the objective of dispersion compensation. Furthermore, even if it is not described here, as a matter of course, corresponding relationships of each characteristic point of the curve, such as each extreme value wavelength of the curve between the curve 2801–2812 should be investigated in advance.

In this manner, by, for example, first moving and determining the incident position of incident light in the direction of arrow 270 of FIG. 3 so as to coincide the band center wavelength $\lambda_0$ of the dispersion compensating element with the center wavelength λ of the incident light to be compensated for dispersion, selecting the shape of the group velocity delay time vs. wavelength characteristics curve used for dispersion compensation from, for example, curves indicated in FIG. 4 by conforming to the ensured contents to be compensated for dispersion, namely the dispersion status of the incident light, and selecting the above incident position in the direction shown in arrow 271 of FIG. 3 in the manner of, for example, each of the points indicated with reference symbols 280–282, dispersion compensation required by the signal light can be performed effectively.

As is also clear from the shape of the group velocity delay time vs. wavelength characteristics curves of FIG. 4, the third order dispersion compensation can be performed by using the optical dispersion compensating element of the present invention, for example, by using curve 2801 and trace dispersion compensation of the second order dispersion can be performed by using a portion near the comparatively linear portion of curve 2811 or curve 2812.

Although the above explanation using FIGS. 2 through 4 has focused on "an element capable of performing dispersion compensation" used in the present invention, it is obvious from above explanation for each curve of FIG. 4 that the use of this "element capable of performing dispersion compensation" makes it possible to compensate the third order dispersion in a certain extent.

However, although it is comparatively easy to make the wavelength bandwidth of dispersion compensation that can be compensated with the "element capable of performing dispersion compensation" alone about 1.5 nm and the group velocity delay time about 3 ps (picoseconds) for signal light in the wavelength rang of around 1.55 μm, when an attempt is made to widen the wavelength bandwidth of dispersion compensation in order to perform dispersion compensation for multi-channel optical communications, it is difficult to obtain group velocity delay time of a degree that allows dispersion compensation to be performed adequately, and further improvements are desired for greater ease of use and broader use of actual communications. Therefore, a more detailed explanation of the present invention is provided using FIGS. 5A through 5D.

FIGS. 5A through 5D provide an explanation of a method for improving the group velocity delay time vs. wavelength characteristics using a plurality of elements capable of performing dispersion compensation. FIG. 5A shows a graph of the group velocity delay time vs. wavelength characteristics of a single element capable of performing dispersion compensation used in the present invention. FIG. 5B shows a graph of the group velocity delay time vs. wavelength characteristics of an optical dispersion compensating element of the present invention composed of two elements in which said two elements are connected in series that are capable of performing dispersion compensation in which the shapes of the group velocity delay time vs. wavelength characteristics curves are nearly the same, but the wavelengths that impart the peak values (hereinafter, to also be referred to as the extreme values) of the group velocity delay time vs. wavelength characteristics curves (hereinafter to also be referred to as the extreme value wavelengths) are different. FIG. 5C shows a graph of the group velocity delay time vs. wavelength characteristics of an optical dispersion compensating element of the present invention composed of three elements in which said three elements are connected in series that are capable of performing dispersion compensation in which the shape of group velocity delay time vs. wavelength characteristics curves are nearly the same, but the extreme value wavelengths are different. FIG. 5D shows graph of the group velocity delay time vs. wavelength characteristics of an optical dispersion compensating element of the present invention composed of three elements in which said three elements are connected in series that are capable of performing dispersion compensation in which the shapes of the group velocity delay time vs. wavelength characteristics curves as well as the extreme value wavelengths are different. In these graphs, group velocity delay time is plotted on the vertical axis and wavelength is plotted on the horizontal axis.

In FIGS. 5A through 5D, reference symbols 301 through 309 indicate each group velocity delay time vs. wavelength characteristics curve of a single element capable of performing dispersion compensation used in the present invention, reference symbol 310 shows a group velocity delay time vs. wavelength characteristics curve in the case of connecting in series two elements capable of performing dispersion compensation of the present invention having nearly the same shape of group velocity delay time vs. wavelength characteristics curves but different extreme value wavelengths, reference symbol 311 shows a group velocity delay time vs. wavelength characteristics curve in the case of connecting in series three elements capable of performing dispersion compensation of the present invention having nearly the same shape of group velocity delay time vs. wavelength characteristics curves but different extreme value wavelengths, and reference symbol 312 shows a group velocity delay time vs. wavelength characteristics curve in the case of connecting in series three elements capable of performing dispersion compensation of the present invention having different shapes of group velocity delay time vs. wavelength characteristics curves and different extreme value wavelengths. Reference symbol a in FIG. 5A indicates the dispersion compensation target wavelength band, while reference symbol b indicates the extreme value of the group velocity delay time.

In FIGS. 5B and 5C, the extreme value of group velocity delay time of group velocity delay time vs. wavelength characteristics curve 310 is 1.6 times the case of a single element capable of performing dispersion compensation, and the dispersion compensation target wavelength band is about 1.8 times the case of a single element capable of performing dispersion compensation. The extreme value of group velocity delay time of group velocity delay time vs. wavelength characteristics curve 311 is about 2.3 times the case of a single element, and the dispersion compensation target wavelength band is about 2.5 times the case of a single element capable of performing dispersion compensation. In FIG. 5D, the extreme value of group velocity delay time of the curve of group velocity delay time vs. wavelength characteristics curve 312 is about 3 times the case of a single element capable of performing dispersion compensation, and the dispersion compensation target wavelength band is about 2.3 times the case of a single element capable of performing dispersion compensation.

The extreme value of group velocity delay time and the dispersion compensation target wavelength band of the group velocity delay time vs. wavelength characteristics curve of an element capable of performing dispersion compensation using a multi-layer film as explained in FIGS. 2 through 4 vary according to the compositional conditions of each reflective layer and each light transmitting layer of the above-mentioned multi-layer film, and an elements capable of performing dispersion compensation having various characteristics such as, for example, a group velocity delay time vs. wavelength characteristics curve in which the dispersion compensation target wavelength band is comparatively wide but the extreme value of group velocity-delay time is not so large as in curve 307 of FIG. 5D, or a group velocity delay time vs. wavelength characteristics curve in which the dispersion compensation target wavelength band is narrow but the extreme value of group velocity delay time is large as in curve 308 can be realized.

Multi-layer film A through multi-layer film H described in the previous section of "disclosure of the invention" are examples of such a multi-layer film used in an element capable of performing dispersion compensation. When elements capable of performing wavelength dispersion were produced using these multi-layer films A through H, group velocity delay time vs. wavelength characteristics curves were able to be realized in which the extreme value of group velocity delay time was 3 ps (picoseconds) and the dispersion compensation target wavelength band was 1.3–2.0 nm with respect to signal light of about 1.55 μm.

An optical dispersion compensating element in which the dispersion compensation target wavelength band is 15 nm that has group velocity delay time vs. wavelength characteristics enabling compensation of dispersion due to optical fiber transmission was realized by connecting in series a plurality of above-mentioned elements capable of performing dispersion compensation. When optical communications were carried out over a transmission distance of 60 km by 100 Gbps using above-mentioned dispersion compensating element as an element capable of performing the third order dispersion compensation of a 30-channel communications system in which signal light wavelength was around 1.55 μm and the band wavelength width of each channel was 0.5 nm, the communications were able to be carried out without any interference by the third order dispersion.

In addition, by making suitable contrivances to select combination way of the elements having group velocity delay time vs. wavelength characteristics of the element capable of performing dispersion compensation that was composed by connecting in series, such as element showing the group velocity delay time vs. wavelength characteristics curve in FIG. 4, the group velocity delay time vs. wavelength characteristics curve of a different shape in FIG. 5D and so on, not only the third order dispersion, but also the second order dispersion were compensated.

In an example of an optical dispersion compensating element in which at least two elements capable of performing dispersion compensation of the present invention are connected in series, in order to realize an optical dispersion compensating element having group velocity delay time vs. wavelength characteristics required to compensate dispersion of the third order or more, it is desirable to be used at least one element capable of performing wavelength dispersion having a group velocity delay time vs. wavelength characteristics curve in which the extreme value of the curve is in the dispersion compensation target wavelength band.

In addition, in order to more effectively perform dispersion compensation of a communication transmission path, it is desirable to improve the group velocity delay time vs. wavelength characteristics curve of the optical dispersion compensating element. As one method of accomplishing this, a means is used that is capable of adjusting the group velocity delay time vs. wavelength characteristics of the element capable of performing dispersion compensation.

As an example of such method, it is mentioned to change group velocity delay time vs. wavelength characteristics of an element capable of performing dispersion compensation by changing film thickness of the light transmitting layers and reflective layers of a multi-layer film in a direction within the incident surface as explained by using FIGS. 2 and 3, and by changing the relative incident position of signal light in an element capable of performing dispersion compensation. A means for changing the incident position of the incident light is realized by moving at least one of either optical dispersion compensating element 200 or the incident light relative to the position of the incident light. Various means for moving the above optical dispersion compensating element or incident light can be selected according to the particular circumstances, such as the conditions under which the optical dispersion compensating element is used, its cost and its characteristics. For example, a method in which movement is carried out by a manual means such as screws can be used in consideration of costs or the apparatus, or in order to make accurate adjustments or in order to allow adjustments to be made when unable to make adjustments manually, the use of an electromagnetic step motor or continuous drive motor is effective. In addition, the use of a piezoelectric motor using PZT (lead zirconate titanate) is also effective. In addition, by using a prism or dual core collimator that allows above-mentioned methods to be combined, or by selecting the incident position by an optical means such as the use of an optical waveguide, the incident position can be selected easily and accurately.

Each layer of a multi-layer film of an element capable of performing dispersion compensation used for the above optical wavelength dispersion compensating element of the present invention is composed of layer L, which is formed with a film produced by ion assist deposition (to also be referred to as an ion assist film) of $SiO_2$ having a thickness of a quarter wavelength, and layer H, which is formed with an ion assist film of $TiO_2$ having a thickness of a quarter wavelength. A layer that combines one layer of the above $SiO_2$ ion assist film (layer L) and one layer of the $TiO_2$ ion assist film (layer H) is referred to as one set of an LH layer, and for example, "laminating five sets of LH layers" means to layering each layer, one layer at a time, in the order of layer L, layer H, layer L, layer H, layer L, layer H, layer L, layer H, layer L and layer H.

Similarly, the previously described LL layer means to one set of an LL layer formed by layering two layers L composed of an $SiO_2$ ion assist film having a thickness of a quarter wavelength. Thus, "laminating three sets of LL layers", for example, means to layering six layers L.

Furthermore, although the example of a dielectric was indicated for the composition of the film that forms layer H, the present invention is not limited to this, but rather examples of dielectric materials identical to $TiO_2$ in addition to $TiO_2$ that can be used include $Ta_2O_5$ and $Nb_2O_5$. Moreover, in addition to dielectric materials, layer H can also be formed by using Si or Ge. In the case of forming layer H by using Si or Ge, there is the advantage of being able to reduce the thickness of layer H according to its optical characteristics. In addition, although the example of $SiO_2$ was indicated for the composition of layer L, and $SiO_2$ offers the advantages of being able to form layer L inexpensively and reliably, the present invention is not limited to this, but rather if layer L is formed by a material having a refractive index lower than the refractive index of layer H, an optical dispersion compensating element can be realized that demonstrates the above effects of the present invention.

In addition, in the present embodiment, although layer L and layer H that compose the above-mentioned multi-layer film were formed by ion assist deposition, the present invention is not limited to this, but rather the present invention demonstrates significant effects even if using a multi-layer film formed by other methods such as ordinary vaporized deposition, sputtering and ion plating.

The optical dispersion compensating element of the present invention can be used by suitably holding that in the shape of a wafer as in multi-layer film 200 shown as an optical dispersion compensating element in FIG. 3. In addition, the optical dispersion compensating element is able to be used as an optical dispersion compensating element by forming into the shape of a chip by cutting into small portions, for example, vertically in the direction of thickness, namely the direction from incident surface 220 to substrate 205, so as to include the portion required on incident surface 220, and, for example, by mounting in a cylindrical case with, for example, a fiber collimator. In any of these cases, the major effects explained in the present invention are demonstrated.

At the present time, the optical dispersion of an optical component such as wavelength selection filter did not be investigated, and has not become a serious problem yet. But, as previously described, the result of investigation performed by the inventors of the present invention revealed that the optical dispersion of the optical component such as wavelength selection filter has some possibility becoming a serious problem according to its application.

To solve the above-mentioned problem, the inventors of the present invention performed the dispersion compensation of the above-mentioned optical dispersion of the optical component by using elements capable of performing dispersion compensation or an optical dispersion compensating element constituted by optically connecting a plurality of locations of a portion of element capable of performing dispersion compensation.

Figures 6A, 6B:
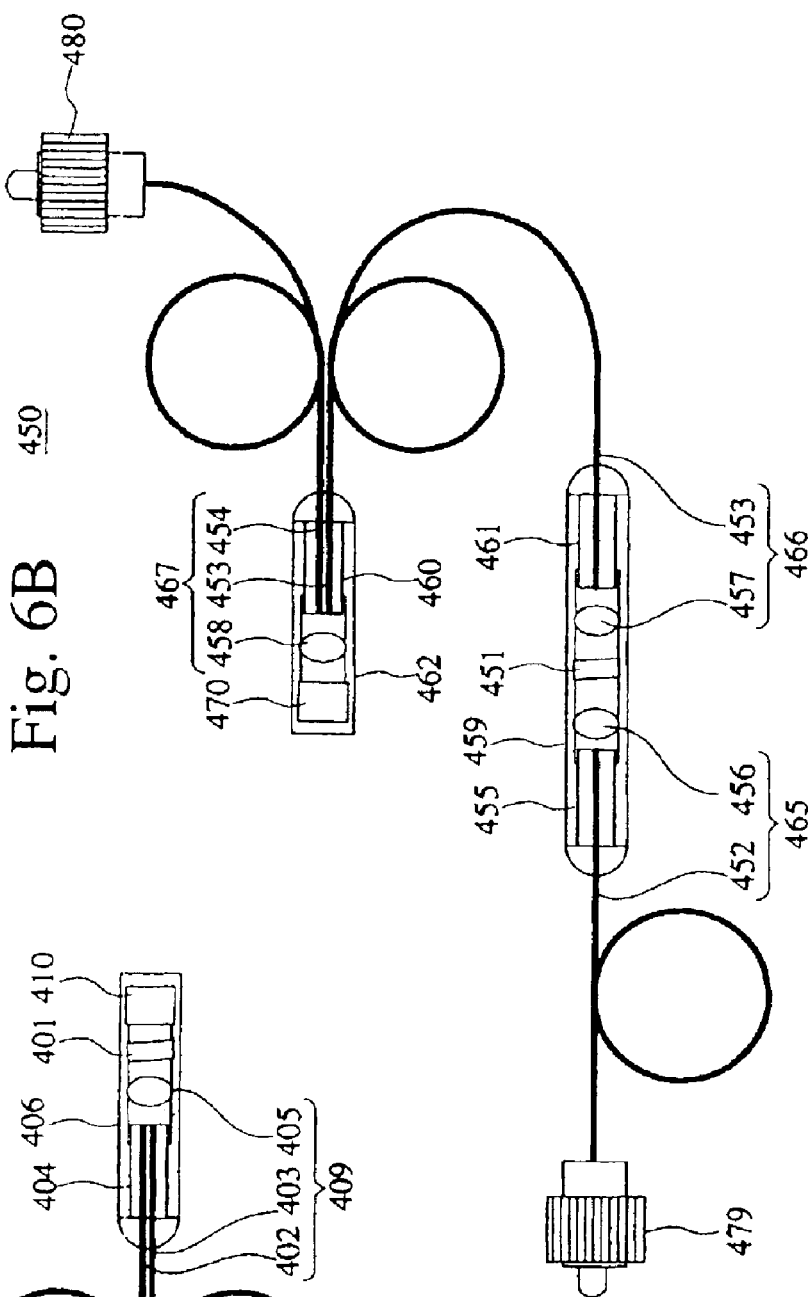
FIG. 6A is a drawing that explains a dispersion compensated optical component and its dispersion compensation method of the present invention, and represents an example of an optical element in which a wavelength selection filter and an optical dispersion compensating element are mounted in a same case.
FIG. 6B is a drawing that explains a dispersion compensated optical component and its dispersion compensation method of the present invention, and represents an example of an optical element in which each of a wavelength selection filter and an optical dispersion compensating element is mounted in a separate case respectively, and the wavelength selection filter and the optical dispersion compensating element are connected through the optical fiber.
Figure 7A:
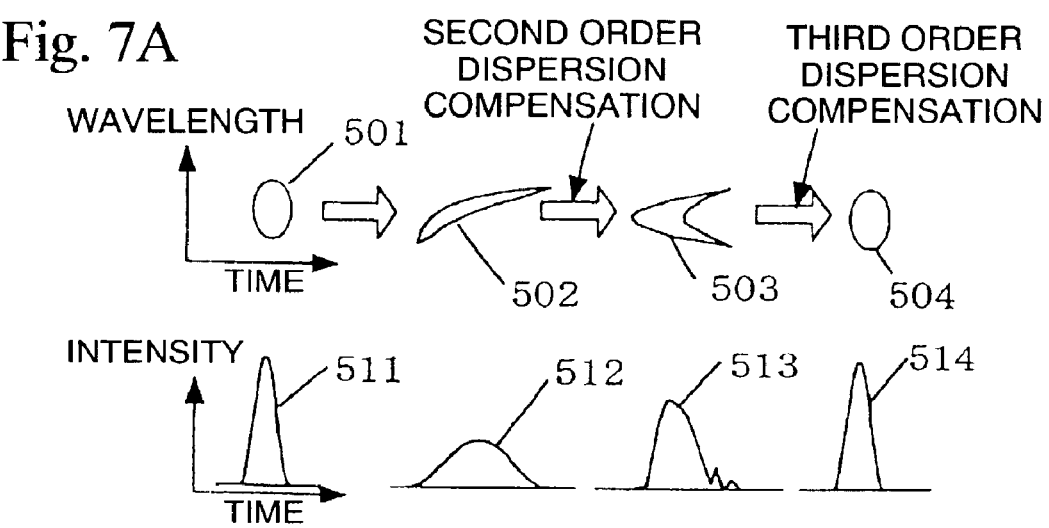
FIG. 7A is a drawing for explaining a compensation method of the second order and the third order wavelength dispersion that explains wavelength vs. time characteristics and optical intensity vs. time characteristics.
Figure 7B:
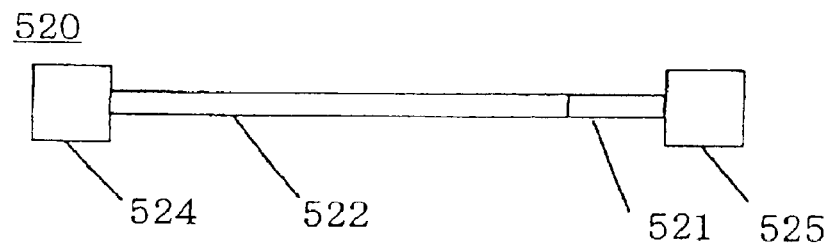
FIG. 7B is a drawing for explaining a compensation method of the second order and the third order wavelength dispersion that explains a transmission path.
Figure 7C:
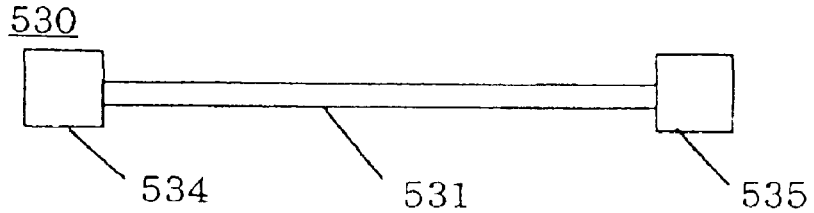
FIG. 7C is a drawing for explaining a compensation method of the second order and the third order wavelength dispersion that explains a transmission path.
Figure 8:
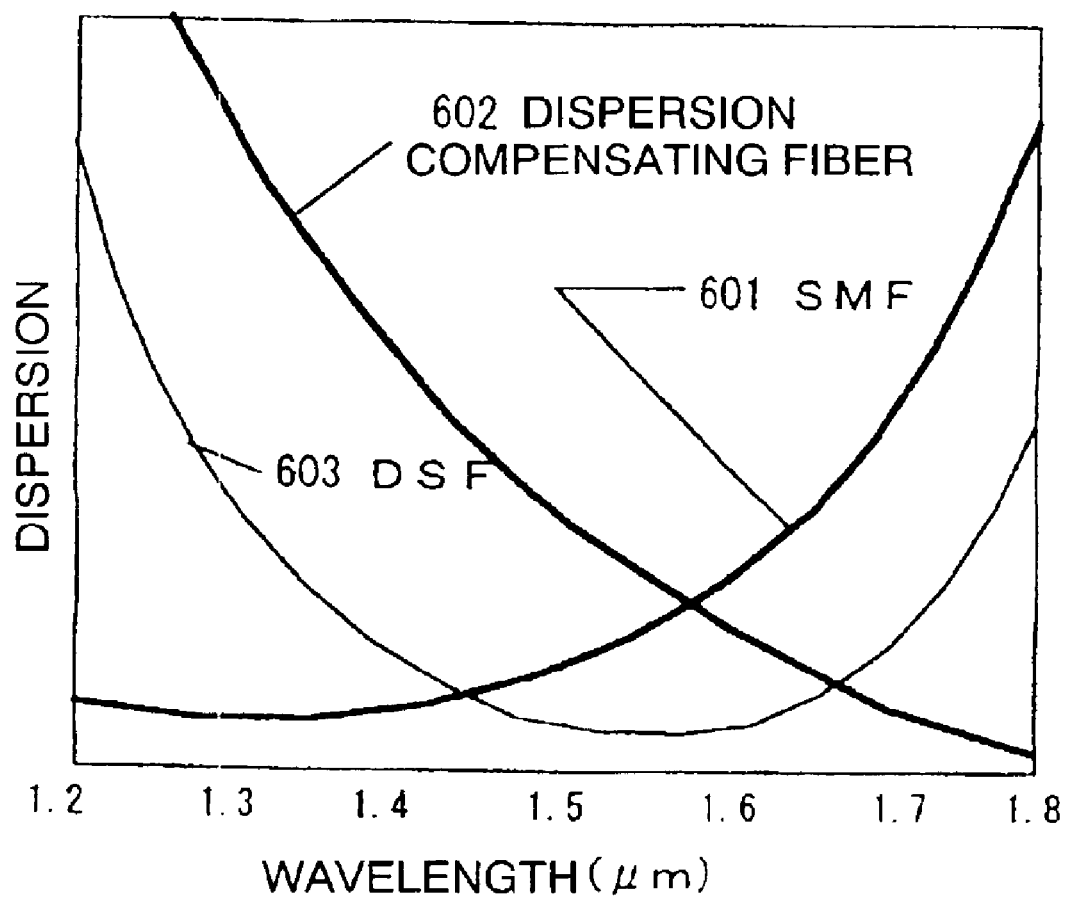
FIG. 8 is a graph showing dispersion vs. wavelength characteristics of an optical fiber of the prior art.

FIG. 6A and FIG. 6B show drawings for explaining the optical component compensated its optical dispersion and its dispersion compensation method of the present invention. FIG. 6A shows an example of an optical component in which a wavelength selection filter as an optical element and an optical dispersion compensating element are mounted in a same case. FIG. 6B shows an example of an optical component in which a wavelength selection filter as an optical element and an optical dispersion compensating element are mounted in different cases respectively.

In FIGS. 6A and 6B, reference symbols 400 and 450 indicate dispersion compensated optical components, reference symbols 401 and 451 indicate wavelength selection filters, reference symbols 410 and 470 indicate the optical dispersion compensating elements, reference symbols 402, 403, 452, 453 and 454 indicate optical fibers, reference symbols 405 and 456–458 indicate lenses, reference symbols 409 and 465–467 indicate collimators constituted with optical fiber and lens, reference symbols 404, 455, 460 and 461 indicate holders, 406, 459 and 462 indicate cases, 477–480 indicate input/output collimators.

In an optical component 400 indicated in FIG. 6A, signal light that has entered from input/output collimator 477 travels through optical fiber 402, and enter the optical dispersion compensating element 410 through lens 405 and wavelength selection filter 401. Signal light that has entered the optical dispersion compensating element 410 is added dispersion having reverse characteristics against the wavelength selection filter 401 and outgoes, then travels through wavelength selection filter 401 again, and enters optical fiber 403 passing through lens 405 and outgoes from input/output collimator 478. The use of the optical dispersion compensating element 410 having a reverse group velocity delay time vs. wavelength characteristics curve against a group velocity delay time vs. wavelength characteristics curve of the wavelength selection filter 401 and having two times absolute value of group velocity delay time of the wavelength selection filter 401 makes it possible completely to compensate the dispersion occurred on the signal light by passing through wavelength selection filter 401.

Collimator 409 shown in FIG. 6A is a dual core collimator constituted with optical fiber 402, 403 and lens 405, and mounted in the case 406 with holder 404.

In the optical component 450 indicated in FIG. 6B, signal light that has entered from input/output collimator 479 travels through optical fiber 452, travels through lens 456 and wavelength selection filter 451, travels through lens 457 and optical fiber 453, enters the optical dispersion compensating element 470 through lens 458, is performed dispersion compensation and travels through lens 458 again, then travels through optical fiber 454, and outgoes from input/output collimator 480. The output signal light from the optical component 450 becomes dispersion compensated signal light, while making the dispersion compensation degree being equal to the degree of dispersion occurred on the signal light by passing through wavelength selection filter element 451.

Collimator 465 shown in FIG. 6B is constituted with optical fiber 452 and lens 456, and mounted in the case 462 with holder 455. Collimator 466 is constituted with optical fiber 453 and lens 457, and mounted in the case 459 with holder 461. Collimator 467 is a dual core collimator constituted with optical fiber 453 and 454 and lens 458, and mounted in the case 462 with holder 460.

As has been explained above, in the optical component of the present invention, the dispersion occurred on the signal light by passing through, for example, wavelength selection filter can be compensated by optically connecting the wavelength selection filter and the optical dispersion compensating element in series along the an optical path of signal light. In this case, the optical dispersion compensating element having bigger dispersion compensation degree than the degree which is necessary to compensate the dispersion occurred on the signal light by passing through wavelength selection filter element can be used for the optical dispersion compensating element in the case of being used for communication using communication transmission path causing the same typed dispersion.

As is clear in the above description, the optical dispersion compensation method for an optical component of the present invention characterized in that the optical dispersion compensation is performed by optically connecting the optical component, for example, functional element such as a wavelength selection filter element, and the optical dispersion compensating element in series along the an optical path of signal light, namely, such that the signal light is added dispersion by passing through the functional element and performed dispersion compensation by passing through the optical dispersion compensating element.

It is clear in the above description that the degree of dispersion compensation performed is different according to the group velocity delay time vs. wavelength characteristics.

Furthermore, a multi-layer film in which a film thickness of a layer varies in a direction within the incident surface can be used for a element capable of performing dispersion compensation of the optical dispersion compensating element 470 of the present invention, an adjustment means which varies the incident position of light in the incident surface can be provided with case 462, and a control circuit can be provided with case to adjust the incident position of light in the incident surface.

As a result of compensating dispersion using the optical dispersion compensating element of the present invention, at least, the optical dispersion occurred on the signal light by passing through an optical component can reliably be compensated, and loss occurred on the signal light by passing through the optical dispersion compensating element is very low value such as less than 0.5 dB. The value of loss above-mentioned is extremely low value comparing with the second order dispersion compensating element using fiber grating of the prior art.

INDUSTRIAL APPLICABILITY

Although the above has provided an explanation of the optical component compensated its optical dispersion using the optical dispersion compensating element of the present invention and the optical dispersion compensation method using the optical dispersion compensating element of the present invention while focusing primarily on the optical dispersion compensating element of the present invention.

The optical dispersion compensating element of the present invention using a multi-layer film to compensate the dispersion of the signal light is capable of especially performing excellent dispersion compensation, the loss occurred on the signal light through the dispersion compensation is extremely low value. The optical component assembled with the optical dispersion compensating element has an advantage such as small-sized, suitable for mass production, and inexpensive. In addition to the dispersion compensation according to the optical dispersion compensating element of the present invention demonstrating particularly significant effects in the third order or more dispersion compensation, it is also capable of performing the second order dispersion compensation by suitably adjusting the group velocity delay time vs. wavelength characteristics.

Finally, the use of the optical dispersion compensating element of the present invention has significant social and economical effects as a result of enabling the use of numerous existing optical communication systems.

What is claimed is:

1. An optical component comprising at least one optical element in which at least the third order dispersion occurs; wherein
   the optical element and an optical dispersion compensating element, or performing at least third order dispersion compensation in a form of wavelength dispersion, comprising a multi-layer film consisting of alternately laminated reflective layers and light transmitting layers and showing a group velocity delay time vs. wavelength characteristics curve having at least one extreme value in a wavelength range being used in optical communications, are placed in an optical path of signal light.

2. The optical component according to claim 1, wherein the multi-layer film comprises at least three reflective layers with mutually different optical reflectance and at least two light transmitting layers formed between the reflective layers.

3. The optical component according to claim 1, wherein the multi-layer film comprises:
   at least five kinds of laminated films with different optical properties, namely, at least five layers of laminated films with different optical properties such as optical reflectance and film thickness;
   at least three kinds of reflective layers with mutually different optical reflectance and at least two light transmitting layers in addition to the three kinds of reflective layers, each of the three types of reflective layers and each of the two light transmitting layers being alternately disposed;
   and a first layer in the form of a first reflective layer, a second layer in the form of a first light transmitting layer, a third layer in the form of a second reflective layer, fourth layer in the form of a second light transmitting layer, and a fifth layer in the form of a third reflective layer, in that order from one side in the direction of film thickness of the multi-layer film,
   wherein, when the center wavelength of the incident light is defined as $\lambda$, and the film thickness is defined as an optical path length relative to light of the center wavelength $\lambda$ of the incident light, the film thickness of each layer composing the multi-layer film in the first through fifth layers is the film thickness of a value within the range of about an integer multiple of $\lambda/4$ in a sense of $\lambda/4 \pm 3\%$,
   wherein, the multi-layer film is composed with a plurality of sets of layers combining a layer H, which is a layer having a higher refractive index and a film thickness of about $\lambda/4$, and a layer L, which is a layer having a lower refractive index and a film thickness of about $\lambda/4$, and wherein the reflectance relative to the center wavelength λ of incident light of each reflective layer of the multi-layer film gradually becomes larger from one side of the multi-layer film in the direction of film thickness of the multi-layer film.

4. The optical component according to claim 3, wherein the layer H is formed with a layer selected from the group consisting of Si, Ge, $TiO_2$, $Ta_2O_5$ and $Nb_2O_5$.

5. The optical component according to claim 3, wherein the layer L is formed with a layer comprised of material of which optical reflectance is lower than material forming the layer H.

6. The optical component according to claim 4, wherein layer L is formed with a layer comprised of $SiO_2$.

7. The optical component according to claim 1, wherein the film thickness of at least one of the laminated film constituting the multi-layer film varies in a direction within a plane in a cross section parallel to the incident surface of light of the multi-layer film, namely, within the incident surface.

8. The optical component according to claim 7, wherein a adjustment means which adjusts the film thickness of at least one laminated film of the multi-layer film, or an adjustment means which varies the incident position of light in the incident surface of the multi-layer film, is provided by coupling to the multi-layer film.

9. The optical component according to claim 1, wherein the optical element and the optical dispersion compensating element are packaged in the same case.

10. The optical component according to claim 9, wherein input and output to the optical component are made using optical fiber.

11. The optical component according to claim 1, wherein the optical element and the optical dispersion compensating element are packaged in different cases, and the optical element and the optical dispersion compensating element are optically connected through optical fiber.

12. The optical component according to claim 1, wherein the optical element is a wavelength selection filter.

13. The optical component according to claim 1, wherein the optical element is an element in which wavelength dispersion occurs.

14. The optical component according to claim 1, wherein a plurality of the optical dispersion compensating elements is connected in series.

15. An optical dispersion compensation method for an optical component comprising at least one optical element in which at least the third order dispersion occurs; wherein
the optical dispersion compensation is performed using the optical element and an optical dispersion compensating element, for performing at least third order dispersion compensation in a form of wavelength dispersion, comprising a multi-layer film consisting of alternately laminated reflective layers and light transmitting layers and showing a group velocity delay time vs. wavelength characteristics curve having at least one extreme value in a wavelength range being used in optical communications or in optical equipment, which are place in an optical path of signal light.

16. The optical dispersion compensation method for an optical component according to claim 15, wherein the multi-layer film comprises at least three reflective layers with mutually different optical reflectance and at least two light transmitting layers formed between the reflective layers.

17. The optical dispersion compensation method for an optical component according to claim 15, wherein the multi-layer film comprises:

at least five kinds of laminated films with different optical properties, namely, at least five layers of laminated films with different optical properties such as optical reflectance and film thickness;

at least three kinds of reflective layers with mutually different optical reflectance and at least two light transmitting layers in addition to the three kinds of reflective layers, each of the reflective layers and light transmitting layers being alternately disposed; and a first layer in the form of a first reflective layer, a second layer in the form of a first light transmitting layer, a third layer in the form of a second reflective layer, a fourth layer in the form of a second light transmitting layer, and a fifth layer in the form of a third reflective layer, in that order from one side in the direction of film thickness of the multi-layer film, wherein, when the center wavelength of the incident light is defined as λ, and the film thickness is defined as an optical path length relative to light of the center way length λ of the incident light, the film thickness of each layer composing the multi-layer film in the first through fifth layers is the film thickness of a value within the range of about an integer multiple of λ/4 in a sense of λ/4±3%, wherein, the multi-layer film is composed with a plurality of sets of layers combining a layer H, which is a layer having a higher refractive index and a film thickness of about λ/4, and a layer L, which is a layer having a lower refractive index and a film thickness of about λ/4, and wherein, the reflectance relative to the center wavelength λ of incident light of each reflective layer of the multi-layer film gradually becomes larger from one side of the multi-layer film in the direction of film thickness of the multi-layer film.

18. The optical dispersion compensation method for an optical component according to claim 15, wherein the film thickness of at least one of the laminated film constituting the multi-layer film varies in a direction within a plane in a cross section parallel to the incident surface of light of the multi-layer film, namely, within the incident surface.

19. The optical dispersion compensation method for an optical component according to claim 18, wherein the optical dispersion compensation is performed using the optical dispersion compensating element which comprises an adjustment means, provided by coupling to the multi-layer film, to adjust the film thickness of at least one laminated film of the multi-layer film, or an adjustment means, provided by coupling to the multi-layer film, to varies the incident position of light in the incident surface of the multi-layer film.

20. The optical dispersion compensation method for an optical component according to claim 15, wherein the optical element is a wavelength selection filter.

21. The optical dispersion compensation method for an optical component according to claim 15, wherein the optical element is an element in which wavelength dispersion occurs.

22. The optical dispersion compensation method for an optical component according to claim 15, wherein a plurality of the optical dispersion compensating elements is connected in series.

* * * * *